April 7, 1953     J. P. BUTTERFIELD     2,633,944
WHEEL COVER WITH COOLING FAN

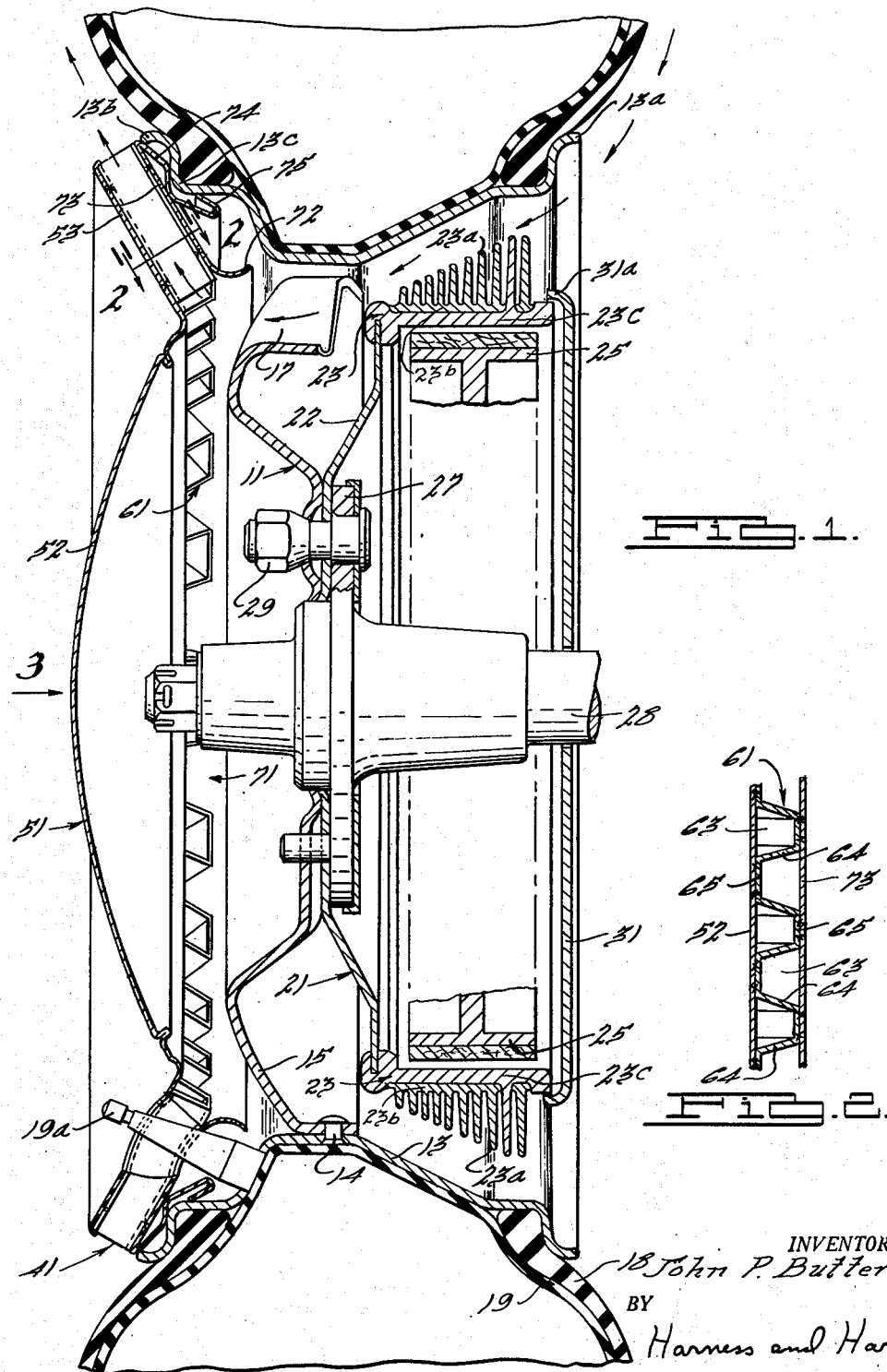

Filed July 9, 1949     2 SHEETS—SHEET 2

INVENTOR.
John P. Butterfield
BY
Harness and Harris
ATTORNEYS.

Patented Apr. 7, 1953

2,633,944

UNITED STATES PATENT OFFICE 2,633,944

WHEEL COVER WITH COOLING FAN

John P. Butterfield, Grosse Pointe Woods, Mich., assignor to Chrysler Corporation, Highland Park, Mich., a corporation of Delaware Application July 9, 1949, Serial No. 103,780

11 Claims. (Cl. 188—264)

This invention relates to a device for cooling the brake drum of a motor vehicle wheel brake or the like and more particularly to the incorporation of such a cooling device in an ornamental wheel covering disc or ring.

It is a primary object of this invention to provide an ornamental wheel cover that includes concealed fan means for circulating air across the wheel brake drum that is normally located axially inwardly of or beneath the wheel cover.

It is a further object of this invention to locate the wheel cover air circulating fan along that region of the wheel cover where it will be most effective as a cooling device for the brake drum and where it will assist the existing pressure differential created forces that tend to circulate air about the wheel brake drum.

It is an additional object of this invention to provide a wheel cover that is highly decorative, relatively simple in construction, and one that includes integrally formed highly efficient means for circulating cooling air about the associated wheel brake drum.

It is a further object of this invention to provide an air circulating fan on a motor vehicle wheel which fan is so arranged that it tends to cool the wheel brake drum and to also circulate air about the associated wheel tire in a manner that will tend to cool the tread surface of the tire and thereby reduce wear of the tire.

Other objects and advantages of this invention will become apparent from a reading of the following description and a consideration of the related drawings wherein:

Fig. 1 is a transverse sectional elevation of a portion of a vehicle wheel assembly including the wheel cover and certain parts of the wheel braking mechanism;

Fig. 2 is a fragmentary sectional elevational view of the wheel cover fan element, the view being taken along the plane indicated by the arrows 2—2 of Fig. 1;

Figure 3:
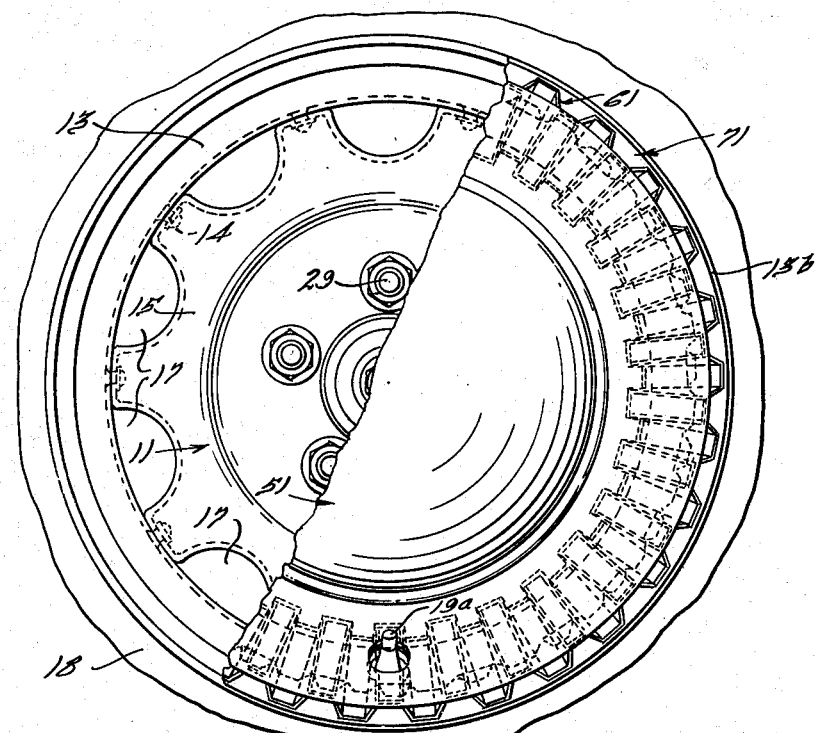
Figure 4:
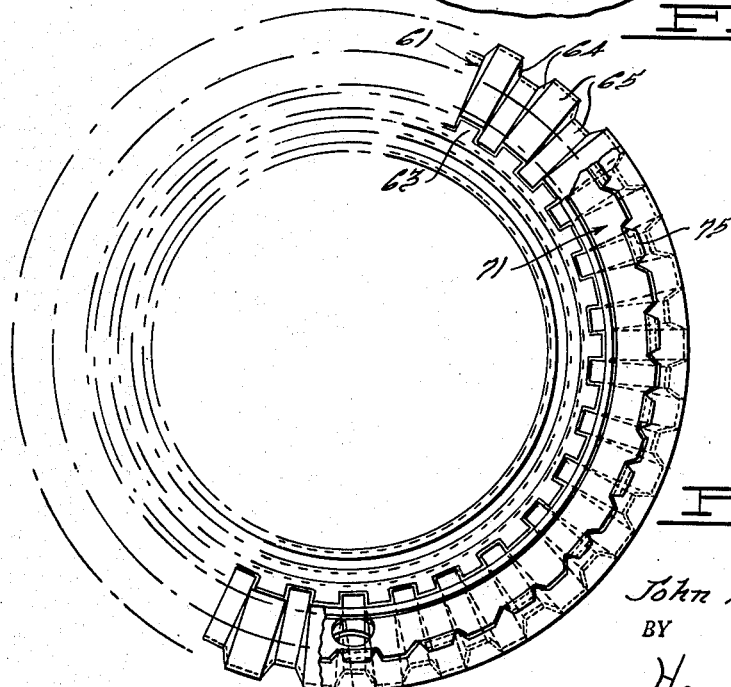

Fig. 3 is a side elevational view of the front of the wheel assembly shown in Fig. 1, the view being taken looking in the direction of the arrow 3 of Fig. 1, certain portions of the wheel cover being broken away to clearly disclose the wheel web and rim construction; and Fig. 4 is a side elevational view of the rear side of the wheel cover, certain portions of the snap ring cover retaining unit being broken away to clearly disclose the fan construction.

As a result of the general desire to improve the visual appearance of the current motor vehicle, it has become quite prevalent to provide motor vehicle wheels with decorative wheel covers. These covers tend to substantially close off the circulation of air through the wheels and across the associated wheel braking mechanisms. At the same time vehicle speeds have increased without an equivalent increase in the size of the associated brake drum consequently more heat is being generated in the drum during braking action while less efficient forms of heat dissipating devices are provided for the drums. This invention provides a highly decorative wheel cover with positive means to circulate cooling air across the associated wheel brake drums, the cooling means being so constructed and arranged that a maximum cooling effect is achieved.

In the drawings the numeral 11 represents a conventional wheel unit formed from an annular rim 13 connected by rivets 14 to a disc-like web portion 15. The periphery of the web portion 15 is formed with a plurality of semi-circular, radially indented, openings 17 that provide air circulation channels through the wheel web portion. The purpose of the openings 17 will become readily apparent from the subsequent description. A tire casing 18, provided with an inflatable tube element 19, is mounted on the rim 13 in conventional manner.

Mounted on the rear side of the wheel web portion 15 is a brake drum 21. Brake drum 21 includes the dished, plate-like support portion 22 on which is mounted the annular peripheral portion 23. Portion 23 provides the braking area which is adapted to be engaged by the movable brake shoes 25. Drum portion 23 is preferably formed with a brake shoe engaging surface 23c composed of some wear resistant, rigid, ferrous material such as cast iron or steel. The outwardly exposed portion 23b of the brake drum is preferably formed of a material such as aluminum which has high thermal conductivity. The portion 23b is provided with a plurality of cooling fins 23a that quickly dissipate the heat generated within the brake drum by application of the shoes 25 to the drum portion 23c during braking operations. The wheel unit web portion 15 and the plate portion 22 of brake drum 21 are secured to the radial extending flange portion 27 of the wheel axle 28 by the bolt and nut connecting means 29. A dust cover 31 extends across the open side of the brake drum 21 so as to provide means for preventing foreign matter from entering the chamber within brake drum 21. It will be noted that the area between the periphery 31a of the dust cover 31 and the inner edge 13a of the wheel rim portion 13 is open to provide an entrance through which air on the inner side of the wheel may readily pass to reach the openings 17 in the wheel web portion 15. Air passing through this entrance area is drawn across the cooling fins 23a on the portion 23b of the brake drum 21 and this dissipates the heat of the fins and cools the brake drum. The many advantages secured by the ready dissipation of the heat of the brake drum, which heat is generated during braking, will not be enumerated now for it is thought that these advantages are well known in the art.

To improve the circulation of air across the portion 23b of the brake drum, which contains the sets of cooling fins 23a, there is provided a centrifugal fan element that is an integral part of the decorative wheel cover unit 41. Wheel cover unit 41 is adapted to be detachably mounted on the outer or normally exposed side of the wheel unit 11 by means subsequently described in detail. Wheel cover 41 is composed of three principal elements, a cover plate or disc 51, an annular fan element 61 and a retaining ring 71. These three elements of the wheel cover are assembled as an integral unit so that the wheel cover unit may be quickly and easily applied to any conventional motor vehicle wheel assembly.

The cover plate 51 has a closed, centrally located, imperforate dished portion 52 that is bounded by a flat-surfaced, substantially imperforate, outwardly diverging, edge portion 53. The cover plate 51 is of such density, size and shape that it substantially covers all of the outwardly disposed side of the wheel assembly 11. Mounted on the rear side of the cover plate edge portion 53 is the annularly shaped centrifugal fan element 61.

Fan element 61 is a ring-like plate member having a plurality of radially extending substantially U-shaped corrugations or channels 63 formed therein. The adjacent corrugations or channels 63 open in opposite directions, consequently the flat base portions 65 of adjacent channels 63 are positioned on opposite sides of the fan member 61. These flat base portions 65 provide surfaces which may be readily connected to the contiguously arranged cover plate 51 and retaining ring 71. The base portions 65 of the fan element corrugations may be connected to the cover plate 51 and retaining ring 71 by welding, riveting, brazing or the like, although spot welding is preferred due to its cheapness and simplicity. From Figs. 3 and 4 it will be noted that the side walls 64 of the channel-like corrugations 63 diverge radially outwardly. The channel side walls 64 constitute the fan vane or blade elements that circulate the air through the wheel unit. The radial taper of the fan blades 64 has a tendency to improve the air flow through the fan element and wheel unit. The outer ends of the parts 64, 65 of the fan corrugations 63 terminate adjacent the outer side edge 13b of the rim portion 13 of the wheel unit 11. This arrangement provides a most efficient fan and one that is practically concealed from the eye of a person looking at the outer side of the wheel cover.

Mounted on the inner side of the fan element 61 is the wheel cover retaining ring 71. Retaining ring 71 includes a curved inner edge 72, a flat-surfaced body portion 73 on which is mounted the base portions 65 of the fan corrugations 63, and a reversely bent outer flange portion 74. Outer flange 74 has an outwardly bent free edge 75 that is sufficiently flexible to provide a spring clip fastening means for anchoring the wheel cover assembly to the step-like shoulder formation 13c of the wheel rim portion 13. The retaining ring 71 as well as the fan element 61 and the cover plate 51 are each provided with suitable aligned openings to receive the valve stem 19a of the inflatable tire tube 19.

It is thought to be apparent from the drawings and description of this wheel cover assembly that the fan element 61 is located as far from the axis of rotation of the wheel as is feasibly possible. As a result of this arrangement, the centrifugal fan effect of fan 61 is the greatest possible for an arrangement of this type and consequently more cooling air will be circulated across the brake drum cooling fins 23a than would be possible with any similar type of fan located radially inwardly of the wheel cover periphery. Furthermore, the fan element 61 is arranged so as to draw air from the inner side of the wheel across the brake drum cooling fins, then through the wheel web openings 17 and into the fan 61 from where it is discharged through the fan channels 63 to the area along periphery of the cover adjacent the outer side of the tire casing 18. By circulating the cooling air in this manner (see arrows) the centrifugal force effect of the fan 61 is assisted by the pressure differential forces normally imposed on the air surrounding the wheel and tire of a conventional motor vehicle.

It has been found that the air on the inner side of the wheel is usually of a higher pressure than the air on the outer side of the wheel due to the fender coverings around the wheel and the like, therefore with the openings 17 through the wheel web portion 15 connected to the fan channels 63 it is only natural that the air on the inner side of the wheel will tend to flow across the brake drum in the manner positively induced by the fan blade elements 64. The load on the fan 61 is consequently reduced by the pressure-differential forces normally tending to move the air from the inside of the wheel to the outside of the wheel.

Not only does the circulation of air through the openings 17 and 63 cool the brake drum 21 but in addition air will be circulated across and around the tread of the associated wheel tire and this will tend to cool the tire and reduce tire wear.

The wheel cover assembly herein disclosed not only provides an ornamental cover for the entire wheel unit 11 but in addition a highly efficient air circulating fan is provided to cool the brake drum and the associated tire. This fan materially improves the braking action and is a step towards an improved brake design. It is well known that if the large clearances that must normally be allowed for brake drum thermal expansion and contraction can be eliminated or reduced an improved brake can be provided at a reduced cost. Another advantage of this wheel cover assembly is that the wheel cover, fan element and cover retaining ring are all made as an integral unit that may be quickly and readily installed on the conventional wheel assembly. No portion of the fan need be permanently mounted on the wheel unit or on the vehicle chassis; therefore manufacture and assembly of the wheel cover is a simple and economical process. It will be noted that the wheel cover is composed of three very simple stampings that may be assembled with a minimum of labor, skill and expense. Because the fan vanes are formed as part of a single plate-like element they are always properly positioned and their assembly does not necessitate a special jig or the like to hold the blades during the mounting of the blades on the cover plate. In addition, the box-like corrugations of the fan element act as spacers for the cover disc and retaining ring and also rigidify the wheel cover assembly to prevent portions of the assembly from vibrating and setting up objectionable noises during rotation of the wheel.

I claim:

1. A wheel cover comprising a cover disc, circumferentially spaced openings through the cover disc adjacent the periphery of the disc, radially disposed fan vanes mounted on the underside of the disc adjacent the periphery thereof and arranged to withdraw air from the underside of said disc and to discharge the withdrawn air through said openings to the upper side of said disc on rotation of said disc, said fan vanes comprising an annular element formed from continuously arranged corrugations of substantially rectangular cross sectional configuration, one side of said annular element abutting the underside of said disc and the opposite side of said annular element being closed by a ring-like plate, and means carried by said cover disc to provide for releasably connecting said cover disc to a wheel.

2. A wheel cover comprising a cover disc, circumferentially spaced openings through the cover disc adjacent the periphery of the disc, radially disposed fan vanes mounted on the underside of the disc adjacent the periphery thereof and arranged to withdraw air from the underside of said disc and to discharge the withdrawn air through said openings to the upper side of said disc on rotation of said disc, said fan vanes being formed from a substantially annular member having a plurality of adjacent, oppositely opening, channel-shaped formations therein, one side of said annular member abutting the underside of said cover disc and the opposite side of said annular member mounting a ring-like wheel cover retaining member, and means carried by said cover disc to provide for releasably connecting said cover disc to a wheel.

3. In combination, a wheel comprising a disc-like web portion with circumferentially spaced openings therethrough and a rim portion secured to the periphery of said web portion, a brake drum secured to one side of said web portion, a wheel cover mounted on said rim portion and extending over the other side of said web portion, said wheel cover comprising an outer disc and a spaced inner ring-like member arranged to extend adjacent the peripheral portion of said outer disc, said disc and ring-like member having vane members connected therebetween and arranged to withdraw air from the area adjacent the brake drum on said one side of the wheel web portion and to discharge air to the other side of said web portion through openings between said disc and ring-like member adjacent the periphery of said outer disc.

4. In combination, a wheel comprising a disc-like web portion with circumferentially spaced openings therethrough and a rim portion secured to the periphery of said web portion, a brake drum secured to one side of said web portion, a wheel cover mounted on said rim portion and extending over the other side of said web portion, said wheel cover comprising an outer disc and a spaced inner ring-like member arranged to extend adjacent the peripheral portion of said outer disc, said disc and ring-like member having radially extending vane members connected therebetween and arranged to withdraw air from the area adjacent the brake drum on said one side of the wheel web portion and to discharge air to the other side of said web portion through openings between said disc and ring-like member adjacent the periphery of said outer disc.

5. In combination, a wheel comprising a disc-like web portion with circumferentially spaced openings therethrough and a rim portion secured to the periphery of said web portion, a brake drum secured to one side of said web portion, a wheel cover mounted on said rim portion and extending over the other side of said web portion, said wheel cover comprising an outer disc and a spaced inner ring-like member arranged to extend adjacent the peripheral portion of said outer disc, said disc and ring-like member having vane members of channel-shaped cross sectional configuration connected therebetween and arranged to withdraw air from the area adjacent the brake drum on said one side of the wheel web portion and to discharge air to the other side of said web portion through openings between said disc and ring-like member adjacent the periphery of said outer disc.

6. In combination, a wheel comprising a perforated web portion and a rim portion attached to the periphery of the web portion, wheel braking means secured to one side of said wheel web portion, a wheel cover secured to said wheel and having an imperforate portion extending over and completely covering the other side of said wheel web portion with the periphery thereof adjacent said rim portion, said cover comprising a disc with radially extending, outwardly directed, fan vanes secured to the underside thereof having the discharge portions thereof positioned adjacent the periphery of said disc, said disc being shaped to provide openings between its periphery and the wheel rim portion, and said vanes being arranged to circulate air from the area adjacent said braking means on said one side of said wheel web portion to the area on the other side of said web portion on rotation of said wheel.

7. In combination, a wheel comprising a perforated web portion and a rim portion attached to the periphery of the web portion, wheel braking means secured to one side of said wheel web portion, a wheel cover secured to said wheel and extending over the other side of said wheel web portion with the periphery thereof adjacent said rim portion, said cover comprising an outer disc and an inner annular member arranged to extend adjacent the underside of the peripheral portion of said outer disc, said disc and annular member having a plurality of radially extending vanes connected therebetween, said disc being shaped to provide openings between its periphery and the wheel rim portion, and said vanes being arranged to circulate air from the area adjacent said braking means on said one side of said wheel web portion to the area on the other side of said web portion on rotation of said wheel.

8. In combination, a wheel comprising a perforated web portion and a rim portion attached to the periphery of the web portion, wheel braking means secured to one side of said wheel web portion, a wheel cover secured to said wheel and extending over the other side of said wheel web portion with the periphery thereof located adjacent said rim portion, said cover comprising a closed outer disc, an annular plate with radially extending corrugations formed therein to provide a rotary fan with a plurality of vanes, said fan being mounted on and arranged to extend adjacent the underside of the peripheral portion of said outer disc, and a ring-like member positioned adjacent to and mounted on the underside of said annular plate and provided with means for releaseably connecting the wheel cover to said wheel, said outer disc being shaped to provide openings between the periphery thereof and the adjacent wheel rim portion, said fan vanes being arranged to circulate air from the area adjacent said braking means on said one side of said wheel web portion to the area on the other side of said wheel web portion during rotation of said wheel.

9. In combination, a wheel comprising a disc-like web portion having circumferentially spaced openings therethrough and a rim portion secured to the periphery of said web portion, said rim portion extending transversely of said web portion, a brake drum secured to one side of said web portion having a flange portion extending transversely of said web portion and spaced radially inwardly of said rim portion so as to define an air duct therebetween, said duct connecting with the openings in said wheel web portion, a wheel cover mounted on and extending over the other side of said wheel web portion, said wheel cover comprising an imperforate disc completely covering said wheel web portion and having centrifugal force activated radially extending fan vane members connected to the underside of the disc adjacent the periphery thereof, said fan vanes being arranged to draw air from the area adjacent the brake drum on said one side of the wheel web portion through said air flow duct to discharge air to the outer side of said cover through openings adjacent the periphery of said cover.

10. A wheel cover comprising an imperforate cover disc of sufficient diameter to completely cover the outer, rim encircled, face of a wheel on which the cover is to be mounted, an annular fan vane supporting plate secured to the underside of said cover disc adjacent the periphery thereof, fastener means carried by said fan vane supporting plate to detachably connect the wheel cover to the wheel on which it is to be mounted, and a plurality of radially extending fan vanes projecting axially inwardly from said plate and arranged to withdraw air from the underside of said cover disc and to discharge the withdrawn air to the outer side of said cover disc along the periphery of said cover disc when said cover disc is rotated.

11. A wheel cover comprising an outer cover disc having an imperforate portion of sufficient diameter to completely cover the outer, rim encircled, side of the wheel on which the cover is to be applied, an annular fan member secured to the underside of the peripheral portion of said cover disc, and a cover retaining means carried by said cover adapted to be detachably engaged with said wheel to space said disc axially from said wheel, the fan member comprising a plate-like member formed with a plurality of radially extending, outwardly directed, flat sided, integrally formed fan vanes arranged to withdraw air from the underside of said cover disc and to discharge the withdrawn air to the outer side of said cover disc along the periphery of said cover disc when said cover disc is rotated.

JOHN T. BUTTERFIELD.

REFERENCES CITED

The following references are of record in the file of this patent:

UNITED STATES PATENTS

| Number | Name | Date |
| --- | --- | --- |
| 2,059,170 | Farr | Oct. 27, 1936 |
| 2,106,702 | Campbell | Feb. 1, 1938 |
| 2,143,950 | Kliesrath | Jan. 17, 1939 |
| 2,179,656 | Eksergian | Nov. 14, 1939 |
| 2,299,796 | Chase | Oct. 27, 1942 |
| 2,441,008 | Chase | May 4, 1948 |
| 2,489,522 | Chase | Nov. 29, 1949 |